Oct. 13, 1964  K. FEDERN  3,152,482
ROTOR BALANCING MACHINE
Filed Oct. 16, 1961  2 Sheets-Sheet 1
FIG.1
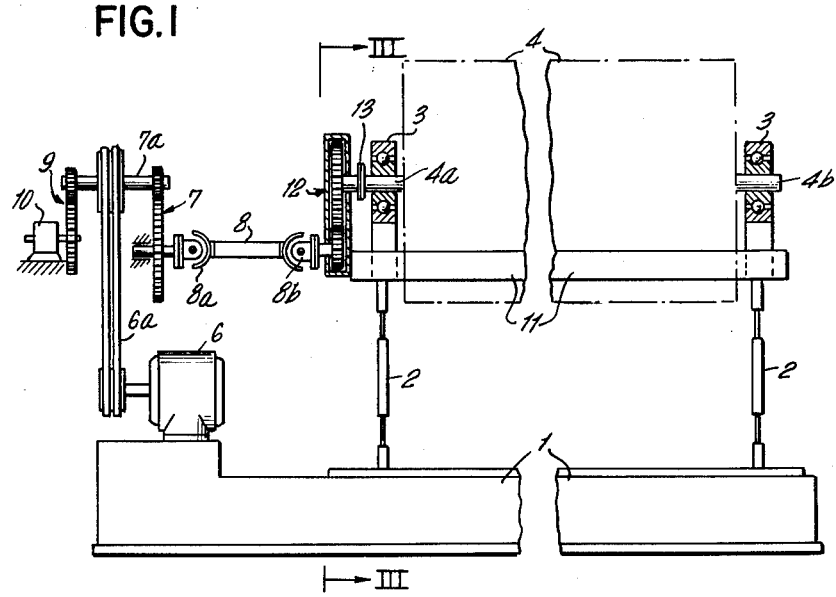
FIG.2
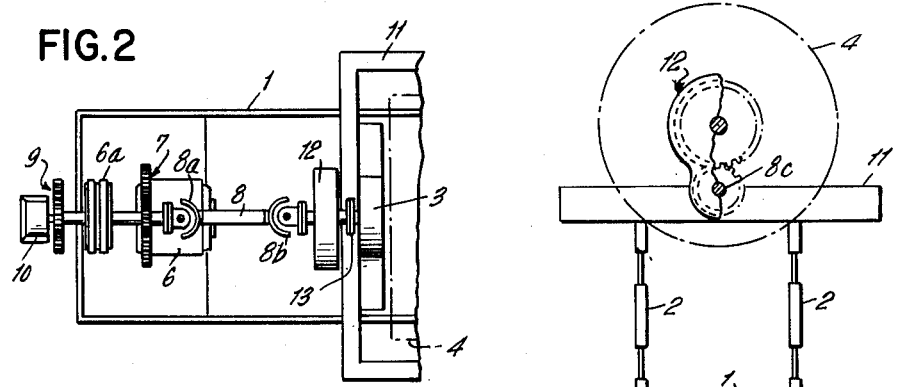
FIG.3
FIG.7
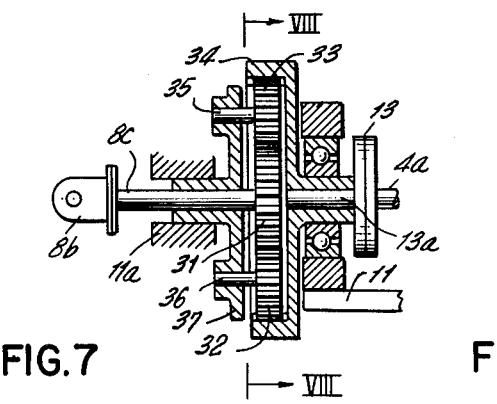
FIG.8
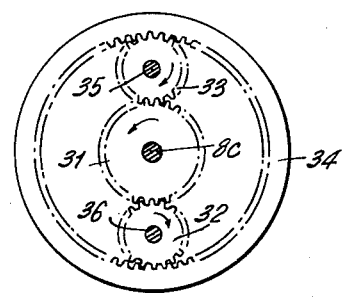

Oct. 13, 1964    K. FEDERN    3,152,482
ROTOR BALANCING MACHINE
Filed Oct. 16, 1961    2 Sheets-Sheet 2
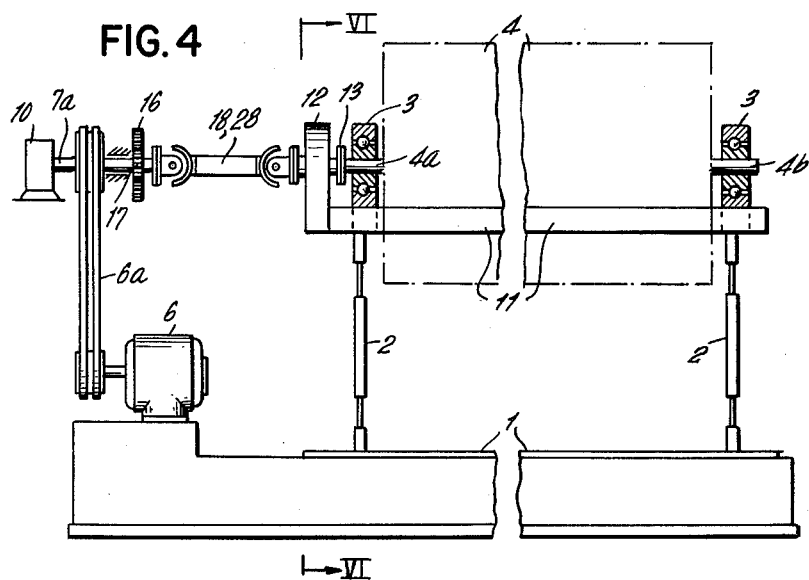
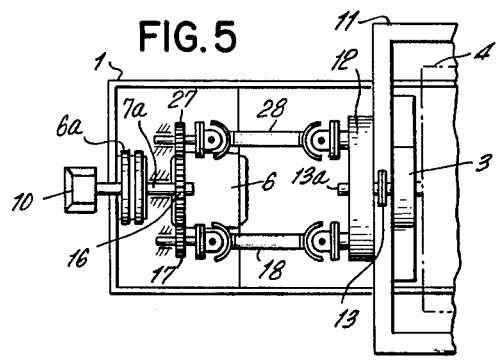
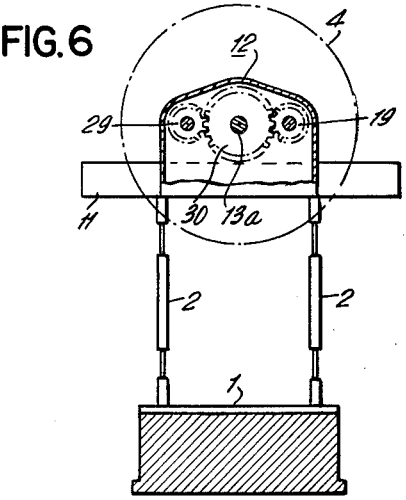
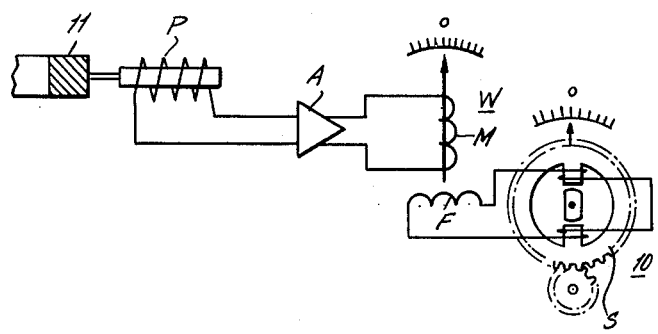

United States Patent Office 3,152,482
Patented Oct. 13, 1964

3,152,482
ROTOR BALANCING MACHINE
Klaus Federn, Darmstadt, Germany, assignor to Carl Schenck Maschinenfabrik G.m.b.H., Darmstadt, Germany, a corporation of Germany
Filed Oct. 16, 1961, Ser. No. 145,402
Claims priority, application Germany Oct. 14, 1960
5 Claims. (Cl. 73—460)

My invention relates to machines for dynamic balancing of rotating workpieces and more particularly to the driving portion of such machines.

As a rule, the workpiece to be tested for unbalance while in rotation is journalled on a frame structure which can vibrate relative to the fixed bed structure of the machine when subjected to periodic forces due to unbalance inherent in the rotating workpiece. These vibrations are sensed for determining the magnitude of the unbalance as well as its location in the workpiece.

With the exception of special machinery for balancing electric motor components, the workpiece in such a machine is driven from an electric motor through a speed-reducing transmission which, like the motor, is mounted on the fixed bed or supporting structure of the machine and hence does not participate in the above-mentioned unbalance-responsive vibrations. This requires transmitting the driving torque from the transmission to the vibratorily journalled workpiece, and this is usually done by means of a flexible shaft connection. Among the flexible connections used for this purpose, the so-called Cardanic shafts are particularly well suitable and reliable, especially where particularly heavy workpieces require the transmission of high torques, or where considerable windage forces are encountered on account of high rotating speeds. Cardanic shafts consist of two shaft ends joined with an intermediate shaft by two respective universal joints so that rotary motion imparted to one shaft end is constrainedly transmitted to the other end without change in the rate of angular speed, regardless of any departure from straight alignment occurring at one or both universal joints. Cardanic shafts have the further advantage that they facilitate establishing a synchronous coupling of the driven workpiece with a phase reference transmitter, such as an alternating-voltage generator, which forms part of many electrical measuring systems employed with balancing machines for translating the above-mentioned vibrations into the unbalance data to be determined.

Nevertheless, the use of Cardanic shafts as a driving transmission in balancing machines is subject to limitations which make themselves more and more felt as the accuracy and speed requirements in modern technology become increasingly exacting. Thus, a Cardanic shaft generally limits the balancing accuracy to a minimum value of about 0.5 micron of residual gravity-center displacement in the workpiece. That is, a balance error of smaller magnitude can no longer be accurately determined. With heavier Cardanic shafts for transmission of extremely high torques, the accuracy limit is attained already at approximately 1 micron of residual gravity-center displacement. The causes of such error limit are the inevitable clearance and the necessary machining tolerances in the universal joints of the Cardanic shaft, also such eccentricity as may occur at the coupling locations with the workpiece due to fitting and centering tolerances, as well as any residual unbalance inherent in the Cardanic shaft itself.

It is an object of my invention to provide a balancing machine, particularly a driving portion for such a machine, in which a Cardanic transmission with its above-mentioned inherent advantages is retained but in which the attainable degree of accuracy is greatly increased above the limits heretofore reached.

To this end, and in accordance with a feature of my invention, I transmit the driving torque from the motor to the workpiece by Cardanic shaft means by also interpose between the Cardanic transmission and the rotor a speed-changing transmission mounted on the oscillatingly supported frame structure of the machine that also carries the journal means for the workpiece. According to another feature of my invention, the frame-mounted speed-change transmission is a speed reduction mechanism and this mechanism, inclusive of the Cardanic shaft means, is symmetrical to the journal axis of the frame structure and, for that reason, is more nearly balanced inherently than is possible with a drive shaft extending in asymmetrical relation to the journal axis of the workpiece.

Due to the fact that the Cardanic shaft rotates at a speed different from, and preferably higher than, that of the workpiece, the residual unbalance or centering errors as well as other rotating forces and moments inherent in the Cardanic shaft do not essentially cause a faulty indication of the rotor unbalance to be determined because of the filtering effect of the measuring systems usually employed in balancing machines. Such filtering effect is inherent, for example, in wattmetric unbalance-measuring devices, as well as in electric balance-analyzing systems that comprise filters tuned to the rotation frequency of the rotor and hence not responsive to the different frequency of the Cardanic transmission. The connection between the speed-changing transmission and the workpiece may be effected by a readily disconnectable coupling consisting, for example, of any entrainer device of any desired type.

The above-mentioned symmetrical design and arrangement of the power transmission, including the speed-change gearing on the oscillatingly mounted frame as well as the Cardanic shaft for driving the gearing, can be designed in different ways. A preferred way, according to a more specific feature of my invention, is to arrange the Cardanic drive shaft, the speed-change mechanism and the workpiece journals in coaxial relation to each other.

According to another, alternative feature of my invention, the speed-change gearing mounted on the oscillatingly supported journalling frame of the balancing machine is provided with two input shafts that extend parallel and in symmetrical relation to the workpiece journal axis and are connected with two mutually parallel Cardanic shafts for the simultaneous transmission of torque to the gearing. Such a symmetrical twin transmission prevents axial oscillations or oscillatory forces from becoming coupled with transverse oscillations, and also prevents that an axial load upon the Cardanic shafts, as may be caused particularly by wind resistance, can cause skewing of a belt drive, if such a drive is employed for transmitting driving power from the motor to the Cardanic shafts.

According to still another feature of my invention, two Cardanic shafts are coupled by a speed-change gearing with the workpiece in such a manner that the two shafts have mutually opposed directions of revolution so that no torques are imposed upon the journalling frame of the machine by the rotor drive. However, the speed-change transmission between the Cardanic shaft means and the rotor workpiece may also be so designed that the differential torque between input and output member of the gearing is minimized. For this purpose, a transmission ratio of 1:0.9 may be employed, resulting in a torque difference of about 0.5–0.9 at uniform sense of rotation.

The electric measuring system of balancing machines, as a rule, is provided with a phase-reference transmitter, such as an alternating-current generator, which furnishes a voltage in synchronism and fixed phase relation to the workpiece rotation. According to another feature of my invention, therefore, another speed-change transmission is inserted between the drive motor and the Cardanic shaft for driving the phase-reference transmitter or generator, this second speed change gearing having a transmission ratio in inverse relation to that acting upon the workpiece, so that the phase reference transmitter will rotate in synchronism and proper phase relation to the workpiece rotor. In cases where a Cardanic shaft, having one end connected with the drive motor and the other with a coaxial speed-reduction mechanism mounted on the vibratory journalling frame, a second transmission mounted on the fixed bed structure between the drive motor and the phase-reference transmitter must be provided for driving the transmitter at synchronous speed. In cases where the transmission between motor and workpiece comprises a belt or friction-wheel drive, it is preferable to couple the phase-reference transmitter directly with the workpiece rotor, for example with the aid of mechanical or optical means known for such purposes.

The foregoing and other objects, advantages and features of my invention, said features being set forth with particularity in the claims annexed hereto, will be apparent from, and will be described in, the following with reference to the embodiments of balancing machines according to the invention illustrated by way of example on the accompanying drawing in which:

FIG. 1 is a schematic front view of a first embodiment, FIG. 2 a partial top view of the same machine, and FIG. 3 a lateral view onto the plane denoted by III—III in FIG. 1.

FIG. 4 shows another embodiment by a schematic front view, FIG. 5 a partial top view of the same machine, and FIG. 6 a lateral view onto the plane denoted by VI—VI in FIG. 4.

FIG. 7 is an axial sectional view of a coaxial speed-reduction mechanism as part of a balancing machine otherwise corresponding to the one illustrated in FIGS. 1 to 3, and FIG. 8 is a lateral view onto the plane denoted by VIII—VIII in FIG. 7.

FIG. 9 is a circuit diagram showing a wattmetric measuring system in its simplest form, as applicable in balancing machines according to the preceding illustrations.

The same reference characters are applied in all illustrations for corresponding components respectively.

The rigid and fixed bed structure 1 of the machine according to FIGS. 1 to 3 carries a journalling frame structure 11 for rotatably accommodating the rotatable workpiece 4, such as a crank shaft or other rotor to be tested. A frame 11 is supported on the bed structure 1 by means of four steel-rod springs 2 of round cross section, so as to be capable of vibratory motion in the horizontal plane due to unbalance of the rotating rotor. The frame 11 is provided with ball bearings 3 in which the shaft ends $4a$ and $4b$ of the rotor 4 are journalled.

Driving power for the rotor is provided by an electric motor 6 mounted on the bed structure 1. The driving connection with the rotor comprises an endless V-belt drive $6a$ and a counter shaft $7a$ acting upon a speed-reduction gearing 7 which, like the counter shaft $7a$, is likewise journalled in fixed bearings on the bed structure of the machine. The driving transmission further comprises a Cardanic shaft 8 and another speed-reduction gear mechanism 12. The Cardanic shaft 8 has the driving portion of one of its universal linkages $8a$ connected with the output shaft of the fixedly mounted reduction gearing 7, and the output end $8c$ (FIG. 3) of its second universal linkage $8b$ joined with the input shaft of the speed-reduction mechanism 12. The mechanism 12 is mounted on the frame structure 11 so that it vibrates together with the frame structure 11 and the workpiece rotor journalled thereon. The output shaft of the step-down gear mechanism 12 is coaxially joined with the rotor shaft $4a$ by a readily disengageable coupling or entrainer device 13 of any suitable type, here shown as a flange-type disc connection. The counter shaft $7a$ also drives, through another step-down transmission 9, an auxiliary generator 10 mounted on, or fixedly connected with, the bed structure 1 of the machine to serve as a phase-reference transmitter of the balance-measuring system, for example in the manner described below with reference to FIG. 9. The transmission ratio of gearing 9 is such that the generator 10 furnishes an alternating voltage in synchronism with the rotation of the coupling 13 and hence the rotor 4.

The balancing machine according to FIGS. 4 to 6 is generally similar to that shown in FIGS. 1 to 3 so that it will only be necessary to describe the essential differences. In lieu of the single Cardanic shaft 8 shown in FIGS. 1 to 3, the machine as illustrated in FIGS. 4 to 6 is provided with two Cardanic shafts 18 and 28 whose respective input ends are coaxially connected with two pinions 17 and 27 jointly driven from a spur gear 16 on the motor-driven counter shaft $7a$. The output ends of the Cardanic shafts 18 and 28 are coaxially joined with respective pinions 19 and 29 in the speed-reduction mechanism 12 mounted on the elastically supported frame structure 11 of the balancing machine. The two pinions 19, 29 are in meshing engagement with a gear 30 (FIG. 6) on the shaft $13a$ of the coupling or entraining device 13 from which the rotor 4 is coaxially driven. In this machine, the two Cardanic shafts 18 and 28, rotating at a different and higher speed than the rotor, have mutually opposed senses of rotation and extend parallel and in symmetrical relation to the rotor axis. This prevents disturbing coupling effects between axial oscillations or oscillatory forces and transverse oscillations. Furthermore, different axial loads imposed upon the Cardanic shaft as may be caused by air resistance or wind forces are made ineffective relative to the gearing 12.

According to FIGS. 4 to 6, the phase-reference transmitter or generator 10 is driven from the counter shaft $7a$ to operate in synchronism with the rotation of the rotor and in a fixed phase relation thereto. In case where such synchronism and phase relation is not reliably secured when operating the phase-reference transmitter from the counter shaft or from any other transmission member intermediate the drive motor and the rotor, as may be the case when the transmission comprises a belt drive or friction gear drive, it is necessary to couple the auxiliary generator 10 directly with the rotor 4. This reliably prevents the occurrence of phase errors due to slippage in the belt or friction drive. The phase-reference transmitter may consist of an electro-dynamic sine-wave generator or may be given any other type or design known and suitable for such purposes, and the coupling between the rotor and the generator may be effected in any known manner, for example mechanically or by optical means.

As mentioned, it is particularly advantageous to provide a coaxial arrangement of a Cardanic transmission shaft, a step-down transmission mechanism, and the rotor. A machine design of this type is shown in FIGS. 7 and 8, illustrating only those components that distinguish the machine from the balancing machines described above with reference to FIGS. 1 to 3.

This machine is provided with only one Cardanic shaft 8 of which one universal joint 8b adjacent to the output end 8c of the shaft is shown in FIG. 7. The shaft end 8c is journalled on a bearing portion 11a of the vibratorily supported frame structure 11 and carries the sun gear 31 of a planetary gearing with two planet gears 32 and 33 which mesh with the sun gear 31 and with an internal-type orbit gear 34. The orbit gear 34 is coaxially joined with the shaft 13a of the coupling 13 for entraining the shaft 4a of the rotor and is also journalled on the frame structure 11. The two planet gears 32 and 33 are revolvably mounted on pins 35 and 36 which extend parallel to the gear axis and are fastened to a carrier 37 stationarily secured to the frame structure 11. Rotation of the Cardanic shaft and of the sun gear 31 connected thereto with causes the orbit gear 34 and hence the rotor coupling 13 to rotate in the opposite sense at reduced speed.

Relative to the machines described above, it is advisable, before performing a balancing operation proper, to balance the Cardanic transmission, inclusive of the frame-mounted transmission gearing, before a workpiece is inserted into the machine.

It has been mentioned above that in the preferred and most advantageous embodiments of machines according to the invention, namely those operating with Cardanic shaft means and frame-mounted reduction gearings that are both symmetrical to the rotor axis, any tendencies toward falsifying the measuring results by such unbalance effects as may be inherent in the transmission or caused by wear of the transmission components are minimized from the outset by the symmetry of the power transmitting components. This augments the conjointly favorable difference between the revolving speed of the rotor and speed of the Cardanic transmission. As mentioned, the reason why this difference in speed further reduces measuring errors resides in the filtering action inherent in the electrical measuring systems of such balancing machines. While the filtering action, in some types of measuring systems, is due to the provision of an electric filter network, it is originally inherent in balance-measuring system of the watt-metric type such as the one schematically shown in FIG. 9 and described presently.

When the rotor, rotating in the balancing machine at the desired constant testing speed, is unbalanced, the supporting frame structure 11 is excited to vibrate at the frequency of rotation. The vibrations are sensed by a transducer, for example a conventional electro-dynamic pickup P, which has a feeler member connected with the frame 11 and translates the mechanical vibrations into a corresponding electro voltage in synchronism with a sinusoidal phase-reference voltage produced by the generator 10. The phase-reference voltages from generator 10 is impressed upon the stationary field coil F of a wattmetric measuring instrument W whose moving coil M is connected through an amplifier A with the pickup P. When the stator S of generator 7 is turned to a position in which the pointer deflection of instrument W is a maximum, this maximum is indicative of the magnitude of the unbalance. When the stator S is turned to a position in which the pointer deflection in instrument W is zero, the angular position of the stator S is indicative of the angular location of the unbalance center relative to the workpiece.

Further details of the electrical measuring system are not shown and described herein because such systems are known as such, for example from U.S. Patent 2,933,984. It is obvious that other, more elaborate measuring systems may likewise be used, such as those known from Reissue Patent 24,620, for example.

The above-mentioned wattmetric deflection comes about as a result of the synchronous currents flowing in the respective coils F and M of the wattmeter W, and there is no response if these two currents do not have the same frequency. Consequently, any unbalance effects that may enter into the pickup voltage because of errors inherent in the Cardanic transmission or any other part connected with the Cardanic shaft means to rotate at the speed of the shaft, cannot falsify the measuring results because this speed is different from the rotor speed and hence also from the speed of the phase-reference generator. In principle, the same effect occurs in other known electric measuring systems operating with a tuned filter network for equivalent filtering action.

Upon study of this disclosure, it will be obvious to those skilled in the art that with respect to details my invention is amendable to a great variety of modifications and hence may be given embodiments other than particularly illustrated and described herein, without departing from the essential features of the invention and within the scope of the claims annexed hereto.

I claim:

1. A rotor balancing machine comprising a fixed machine structure, a frame oscillatingly mounted on said structure and having journal means for rotatably supporting a rotor to be balanced, coupling means rotatably mounted on said frame in coaxial relation to said journal means for rotating the rotor, a speed-reduction mechanism having an output member coaxially joined with said coupling means and having power input means in substantially symmetrical relation to the axis of said journal means and coupling means, said power input means comprising Cardanic shaft means, a drive motor mounted on said fixed machine structure, and speed-reducing transmission means connecting said motor with said Cardanic shaft means for driving the latter.

2. A rotor balancing machine comprising a fixed machine structure, a frame oscillatingly mounted on said structure and having journal means for rotatably supporting a rotor to be balanced, coupling means rotatably mounted on said frame in coaxial relation to said journal means for rotating the rotor, a speed-reducing gear transmission mounted on said frame and having input and output members coaxial with said journal means, said output members being joined with said coupling means, a Cardanic shaft having two ends of which one is joined with said input member, a drive motor mounted on said fixed machine structure, and speed-reducing transmission means connecting said motor with said other end of said Cardanic shaft for driving the latter.

3. A rotor balancing machine comprising a fixed machine structure, a frame oscillatingly mounted on said structure and having journal means for rotatably supporting a rotor to be balanced, coupling means rotatably mounted on said frame, in coaxial relation to said journal means for rotating the rotor, a step-down gear mechanism also mounted on said frame and having an output member connected with said coupling means, said mechanism having two input shafts whose respective axes are parallel and symmetrical to the axis of said journal means, two Cardanic shafts extending generally along said two respective axes and being connected with said respective input shafts for jointly driving them simultaneously, a drive motor mounted on said fixed structure, and transmission means connecting said motor with said two Cardanic shafts to impart driving power thereto.

4. A rotor balancing machine comprising a fixed machine structure, a frame oscillatingly mounted on said structure and having journal means for rotatably supporting a rotor to be balanced, coupling means rotatably mounted on said frame in coaxial relation to said journal means for rotating the rotor, a speed-reduction mechanism having an output member coaxially joined with said coupling means and having power input means in substantially symmetrical relation to the axis of said journal means and coupling means, said power input means comprising Cardanic shaft means, a drive motor mounted on said fixed machine structure, speed-reducing transmission means connecting said motor with said Cardanic shaft means for driving the latter, and balance measuring means responsive to vibration of said frame and tuned to the rotary frequency of said coupling means so as to be substantially insensitive to the frequency of said Cardanic shaft means.

5. In a balancing machine according to claim 4, said balance-measuring means comprising a phase-reference transmitter mounted on said machine structure and connected to said transmission means to be driven in synchronism with said coupling means.

References Cited in the file of this patent
UNITED STATES PATENTS

| | | |
|---|---|---|
| 1,296,610 | Akimoff | Mar. 11, 1919 |
| 1,398,333 | Lundgren | Nov. 29, 1921 |
| 1,800,553 | McCabe | Apr. 14, 1931 |
| 2,054,267 | Ohlson | Sept. 15, 1936 |
| 2,171,927 | Fuchs | Sept. 5, 1939 |
| 2,331,733 | Senger | Oct. 12, 1943 |
| 2,706,399 | Federn | Apr. 19, 1955 |
| 2,787,907 | King | Apr. 9, 1957 |